Figure 23:
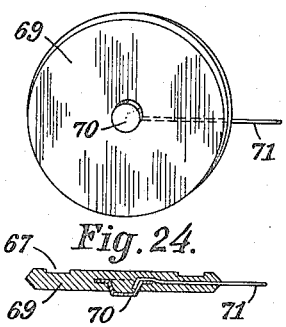
Figure 24:

B. GWÓŹDŹ.
THERMO TELEPHONE.
APPLICATION FILED AUG. 15, 1911.
1,135,686.
Patented Apr. 13, 1915.
3 SHEETS—SHEET 1.
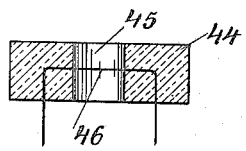
Fig. 1.
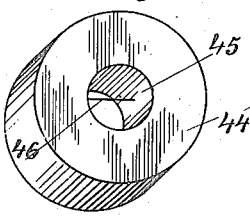
Fig. 2.
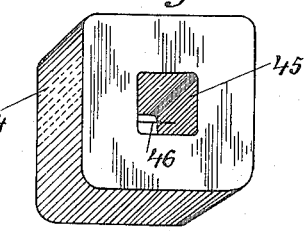
Fig. 3.
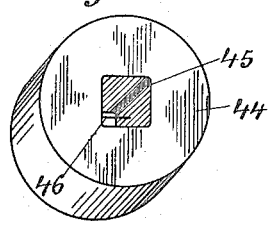
Fig. 4.
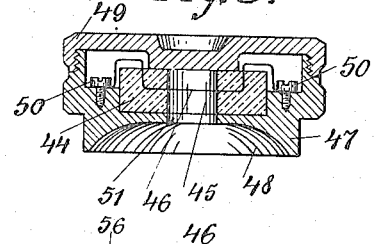
Fig. 5.
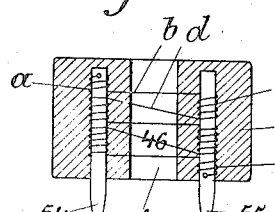
Fig. 9.
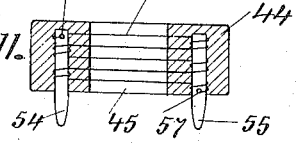
Fig. 11.
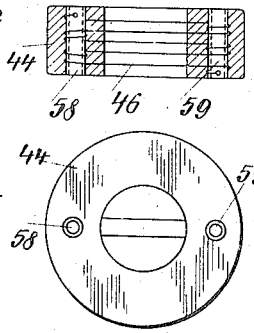
Fig. 12.
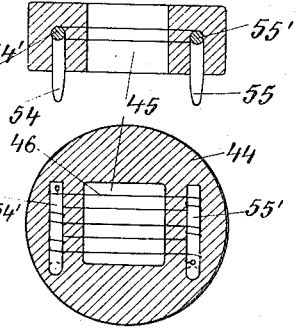
Fig. 14.
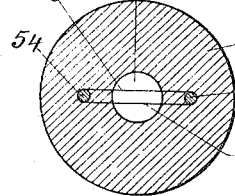
Fig. 10.
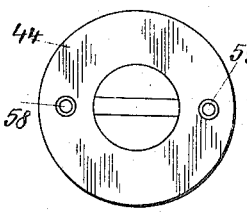
Fig. 13.
Fig. 15.
WITNESSES:
John Murtagh
L. M. Dorman
INVENTOR
Bronislaw Gwóźdź
BY Joseph Joseph
his ATTORNEYS.

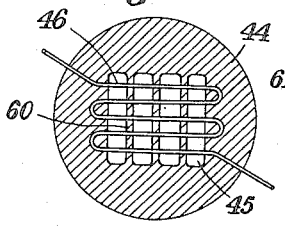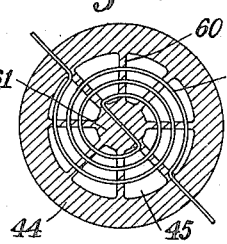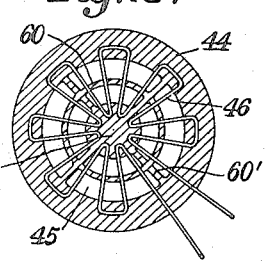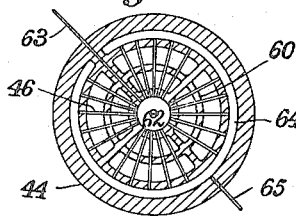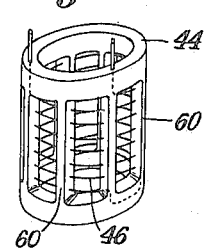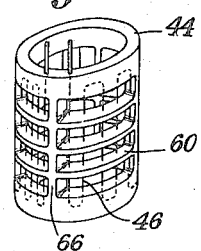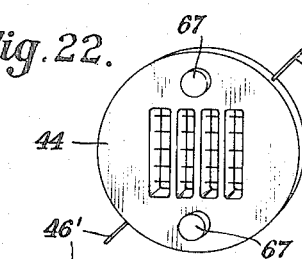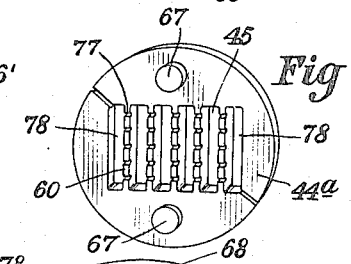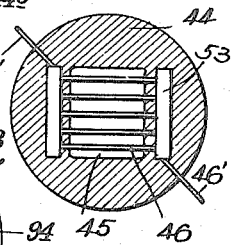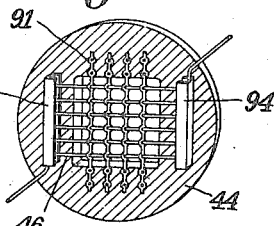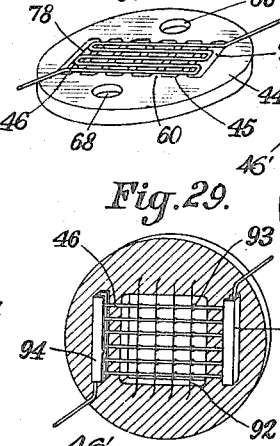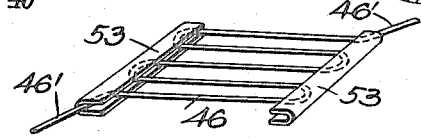

B. GWÓŹDŹ.
THERMO TELEPHONE.
APPLICATION FILED AUG. 15, 1911.

1,135,686.

Patented Apr. 13, 1915.
3 SHEETS—SHEET 3.

WITNESSES:
John Murtagh
L. M. Dorman

INVENTOR
Bronislaw Gwóźdź
BY Joseph Zerfu
his ATTORNEYS.

UNITED STATES PATENT OFFICE.

BRONISŁAW GWÓŹDŹ, OF SCHLACHTENSEE, NEAR BERLIN, GERMANY.

THERMO-TELEPHONE.

1,135,686.  Specification of Letters Patent.  Patented Apr. 13, 1915.

Application filed August 15, 1911. Serial No. 644,243.

*To all whom it may concern:*

Be it known that I, BRONISŁAW GWÓŹDŹ, a subject of the Czar of Russia, and residing at Schlachtensee, near Berlin, Germany, have invented certain new and useful Improvements in Thermo-Telephones, of which the following is a specification.

My invention relates to thermo-telephones or the like, of the kind as described in my prior Patent, No. 998,965, issued July 25th, 1911. In the examples as described and illustrated in the said Letters Patent, the Wollaston wire has the form of bows which project from one end of the block-like cast. This arrangement necessitates that when such a hot wire device is built into a telephone casing, a suitable sound chamber must be provided in the latter, in which the hot wire can bring about the heating of the surrounding medium e. g. air. In many instances however, particularly when the hot wire device is to be somewhat large, as in a telephone receiver to be held in the usual manner at the ear, it is preferable for various reasons to form the cast in such manner that it contains at the same time the sound chamber requisite for the action of the hot wire. This is obtained according to the invention by making a framelike cast having an aperture therein, in which is placed or which is traversed by the Wollaston wire or the like, the limbs of which projecting out of the cast and the portions of which placed in or traversing the aperture being free from the coating of the wire.

In the accompanying drawings a plurality of constructions is illustrated.

Figures 1 to 4 show forms in which the cast is formed as a frame which simultaneously serves as the sound chamber for containing the hot wire; Fig. 5 is a section through a telephone for hot wires according to Figs. 6 to 8; Figs. 6 to 8 show framelike casts containing serpentine hot wires whose turns may be connected in parallel or in series; Figs. 9 to 15 show framelike hot wire devices, whose hot wires are arranged on special suspension rods or their equivalent acting as contact members; and Figs. 16 to 29 show forms of hot wire devices having the form of a flat framework, and molds for making the means for combining a plurality of hot wires into one entirety for the purpose of obtaining great capability of performance.

Similar reference numerals indicate corresponding parts throughout the figures.

As Figs. 1 to 4 show, the cast 24 has the form of a frame-like block which consequently has an aperture 45, within which is arranged the hot wire 46. The aperture 45 can therefore at once be used as the sound chamber so that the casing containing the cast does not require to be provided with a special sound chamber. The form of the cast may of course be as desired. In Figs. 1 and 2 it has the shape of a cylindrical frame and its central aperture 45 is also cylindrical, Fig. 3 shows a square frame having a square aperture, while Fig. 4 shows a cylindrical block having a square aperture. Other forms are possible in which the action is the same. The hot wire may be arranged as desired when provision is made that a part of it is located within the aperture or sound chamber 45. Preferably, however, the hot wire 46 is arranged transversely of the longitudinal axis of the sound chamber, as shown in the drawing. In this event only one suitable incision is requisite in the core of the mold by which the aperture 45 in the block 44 is formed, in order securely to hold the Wollaston wire while the cast is being made.

Fig. 5 shows in section part of a telephone comprising a frame-like cast. A casing is employed comprising only two parts, namely the front part 47 having a recess 48, and a cover or lid 49 screwed on the front part. The latter is also recessed for receiving the frame-like block 44. The ends of the hot wire are connected with screws 50 or other contacts, to which the current is supplied. The aperture 45 in the block 44 is closed at the rear by the cover 49. In the front part 47 is provided the hole 51 forming a continuation of the sound chamber 45 in the block and connecting the sound chamber with the outer air, so that the sound waves produced in the sound chamber pass by way of the earpiece 48 directly into the ear. The casing for holding this block 44 may have any other desired form without departing from the scope of the invention. Whereas in Figs. 1 to 5 only one hot wire is represented, the arrangement may be such that a plurality of hot wires traverses the sound chamber 45 of the frame-like cast 44, in which event the individual strands of the hot wire may be connected in series or in parallel, as shown in Figs. 6 to 8, depending on the kind of telephone currents at disposal. To this end, the Wollaston wire 46 has a serpentine shape and its ends 46′, which are to be connected with the contacts, or are to serve for making other connections, project out of the frame-like cast 44. The serpentine turns of the wire are of such a size that the ends 52 of the turns (Fig. 6) extend into the cast 44, so that in the aperture 45 there are only parallel strands which are liberated from the silver envelop during the corrosive process and constitute the hot wires proper. When such a serpentine Wollaston wire is embedded in a cast 44 in the manner shown in Fig. 6, the individual strands or the various hot wires which traverse the aperture or the sound chamber 45 are connected in series, so that the current traverses the adjacent strands in opposite direction whereby self-induction is negatived, a circumstance which, as compared with all electromagnetic telephones appears to be an improvement. Such a serpentine Wollaston wire, however, may have its individual strands connected in parallel, as may be preferable for certain telephone currents. In this case U sheet-metal channels 53 of suitable size are employed, in the manner shown in Figs. 7 and 8, pushed onto the ends 52 of the strands and secured thereon either by pinching them together on the strands or by soldering. Instead of these U members 53 other bodies may, of course, be employed, but they should always be made so that the ends of the strands are connected with one another on at the two ends, so that the hot wires traversing the sound chamber or the aperture 45 are connected in parallel. When the wire has been provided in this manner with the channels 53, as described above it is placed in a mold and provided with the frame-like cast 44 in such manner that the strands of the wire traverse the aperture or sound chamber 45, whereas the ends of the strands are embedded together with the channels 53 in the cast. The corrosive process can then take place.

In order that the self-induction may be made inoperative likewise when the various hot wires are connected in parallel in the manner described, as will be described in more detail hereinafter two or more such frame-like blocks provided with hot wires may be arranged one above another so that the apertures or sound chambers 45 of the superposed blocks communicate one with another. The connection will be such that all the hot wires of adjacent blocks are traversed by current flowing in opposite directions, so that self-induction is negatived. Obviously, the shape of the blocks and also that of the apertures or sound chambers 45, as represented in Figs. 23 to 26, may be modified without departing from the scope of the invention.

In Figs. 9 to 15 other forms of hot wire devices are shown comprising a frame-like cast, in which the Wollaston wire is wound on special supports, e. g. rods or tubes, which on their part can be very suitably used with their ends projecting out of the cast as contacts for the hot wire device. These rods simultaneously enable the Wollaston wire to be suitably disposed and mounted. In the example shown in Fig. 9, the frame-like cast 44 containing the sound chamber 45 carries the Wollaston wire 46 wound on two rods 54, 55 in such manner that the wire repeatedly traverses the sound chamber; the various hot wires, however, are formed by only one single Wollaston wire, this being effected as follows: First a number of turns $a$ are wound on the rod 54, for example, and then the part $b$ of the wire is pulled across to the other rod 55 where a number of turns $c$ is wound and then the part $d$ is drawn across to the rod 54. In like manner a number of turns is wound on the rod 54 again and then a new connecting wire is drawn to the opposite rod, until finally the desired number of such connecting wires is obtained. The free end of the wire is secured in similar manner by a number of turns. In consequence of these turns $a, c, e \ldots$ the position of the connecting wires $b, d \ldots$ is exactly determined in each instance, so that these wires cannot shift. Further, as can be seen from the drawing and particularly from Fig. 10, adjacent connecting wires $b\ d \ldots$ are located on different sides of the supporting rods 54 and 55. The purpose of this is, on the one hand, to utilize the sound chamber 45 well and, on the other hand, certainly to prevent the hot wires contacting one with another where they are exposed in the sound chamber after the cast has been made. When the hot wire device comprising the rods 54, 55 and the Wollaston wire has been made, it is placed in a suitable mold and, for forming the sound chamber 45, a core is inserted which, of course, must have slots for the passage of the connecting wires $b, d \ldots$ The cast is then formed in the mold so that it obtains a frame-like shape and leaves exposed only those parts of the wire which traverse the aperture 45. Consequently, the corrosive process affects only parts of wires exposed in the aperture or hole 45. The ends of the rods 54, 55 projecting out of the cast can serve for supplying and leading away the current. They preferably have pointed ends in order that they can readily be used, if desired, as contact pins. In the example shown in Figs. 9 and 10, the individual hot wires traversing the sound chamber are connected in parallel by the rods 54, 55. They can, however, be arranged connected in series when, as shown in Fig. 11, the rods 54, 55 are covered at the parts embedded in the cast 44 and in contact with the turns of wire with any suitable insulation, e. g. by enameling them. Only the ends of the wire 46 are then connected at 56 with the metallic core of the rod 54 and at 57 with the metallic core of the rod 55 so that when the rods 54, 55 are energized the current must pass through all the hot wires in series.

Instead of the supporting rods 54, 55 other bodies can be employed; particularly, tubes 58 and 59 can be employed in the manner shown in Figs. 12 and 15, the same being embedded their entire length in a frame-like cast block 44. The Wollaston wire 46 is wound in the above described manner on the surface of these tubes which here serve as hollow contacts, but in this case corresponding pins of suitable diameter must be provided in the case of the telephone. Here also the hot wires 46 are connected either in parallel, when the turns of the Wollaston wire on the tubes 58, 59 are metallically connected with the latter, or in series, when the surfaces of the tubes are covered with any suitable insulation. As compared with the rods, the tubular form of the supports has the advantage that such hot wire devices can be more readily packed and despatched because they have no projecting parts.

As shown in Figs. 14 and 15, the supports can also be disposed so that the various hot wires are located parallel to the plane of the block, instead of at right angles thereto, as in Figs. 9, 11 and 12. To this end, it is only necessary to employ rods 54', 51' bent at right angles, as shown in Figs. 14 and 15, whose parts at right angles to the plane of the frame project out of the frame-like block 44, whereas the parts at right angles to the former parts and located parallel with the said plane serve for carrying the turns of the Wollaston wire 46 and are embedded in the frame-like cast. Here also the hot wires can be connected as described above in series or in parallel. Obviously, in this latter form, tubular supports may be used, or only those parts of the supports located at right angles to the plane of the frame may be hollow so that projecting parts can be avoided. The object of the forms shown in Figs. 1 to 15, to increase the capacity of a thermo-telephone by increasing the number of the hot wires in the frame-like cast may, however, occasion certain difficulties under certain circumstances, particularly when a large sound orifice is used, owing to the wires, which are long in such a case, being subjected under the influence of the current traversing and heating them, to expansion and to distortion which are caused by the electro-dynamic forces of the currents flowing in the hot wires, and which may bring about either a contact of the individual hot wires one with another or their fracture. These defects make themselves particularly felt when it is wished to arrange these wires as close together as possible for the purpose of obtaining as favorable acoustic results as possible. The mentioned defects can, however, be readily obviated when the cast carrying the hot wires is given the form of a flat or spacial (bodily) frame-work whose individual ribs or bars are located relatively close together and in which the Wollaston wire wound in various ways is embedded in such manner that the one or more wires traverse the ribs or bars. A device is then obtained comprising a number of relatively short wires located close together, so that the wires are no longer so exposed to injury. Various forms of such arrangements are represented in Figs. 16 to 19.

In the illustrative embodiment shown in Fig. 16 the frame-like block 44 is transversely subdivided by bars or ribs 60, so that the spaces 45 between these ribs act as sound chambers just as in the above-described forms. The Wollaston wire is serpentine so that the various strands traverse the sound chambers or ribs 60, and consequently a number of hot wires is formed corresponding to the number of strands and ribs. These ribs are preferably made by casting them in a mold at the same time as the frame-like cast is made. The Wollaston wire is partially embedded in these ribs 60 so that during the subsequent corrosive process only the freely exposed parts of the wire are liberated from their silver casing and subsequently employed as hot wires. Consequently, only short hot wires are produced which on the one hand are securely mounted both in the outer frame of the cast and also in the ribs, and on the other hand, when the number of such ribs is suitable, can expand so little that they cannot contact with the adjacent hot wires and consequently can be arranged very close together, which is very advantageous acoustically. Instead of the series connection shown in Fig. 16, the hot wires can be connected in parallel in the described manner when the means shown in Figs. 7 and 8 are employed.

In the illustrative embodiment according to Fig. 17 the Wollaston wire has the form of a flat spiral while the ribs 60 are arranged radially and run together into a core 61 in the middle. Here also the ribs 60 are arranged transversely of the Wollaston wire, so that only short parts of wire are produced which are used as hot wires. For the purpose of avoiding self-induction these spirals can be wound so that the current always flows in opposite directions in adjacent wires.

In Fig. 18 is shown instead of the spiral Wollaston wire a stellar wire 46 whose parts or strands are located substantially radially in the frame of the cast 44. The bars or ribs 60 for the hot wires here constitute concentric rings. These rings are united by short ribs 60′ with the outer frame of the cast 44 and with the core 61. In this form also the current always flows in opposite directions in the adjacent conductors, so that here also losses due to self-induction are avoided. Here also the parallel connection is possible, as shown in Fig. 19. A number of radially-positioned Wollaston wires 46 is arranged in the manner of spokes, the wires being connected in the middle with two disks 62, e. g. by riveting, which can be connected by the line wire 63 with the one pole of the source of current. The outer ends of the radial wires 46 are connected with an outer metal ring 64 which can be connected by a wire 65 to the other pole of the source of current. Just as in Figs. 7 and 8 this ring has an approximately U section, its open side being directed inwardly, and is embedded in the cast 44. The various wires 46 traverse transverse ribs 60 which likewise have the form of concentric rings, as shown in Fig. 18.

The hot wire device need not have the form of a flat, frame-like structure as shown in Figs. 16 to 19, it being possible to obtain the same effect by a structure occupying a greater space by giving the same a cylindrical shape, as shown for example in Figs. 20 and 21. In the illustrative embodiment according to Fig. 20 the Wollaston wire has the form of a helical spiral whose turns are secured at a suitable distance from one another by a number of ribs and are so wound for avoiding self-induction that the current always flows in opposite directions in adjacent wires, a bifilar winding being produced. Here also only short wires which are effective as hot wires are obtained. A cast constituting such a cylindrical structure is preferably inserted in a holder composed of metal or other heat resisting material so that the interior of the cylinder simultaneously forms the sound chamber. Also, a plurality of such cylindrical hot wire devices can be inserted one in another when a greater acoustic effect is required, the diameters of the cylinders being, of course, adapted for such an arrangement.

In the illustrative embodiment according to Fig. 21 the arrangement is substantially the same; a serpentine Wollaston wire 46 is, however, provided whose turns are located parallel to the geometrical axis of the cylindrical structure, while the ribs 60 have the form of concentric rings united one with another by axially located ribs 66 to form an entirety. Such structures may have numerous other forms. Thus cubical or pyramidal or, indeed, hemispherical structures may be employed, in which parts of one or more Wollaston wires are embedded, while the intermediate parts are exposed and subsequently subjected to the corrosive process.

Figure 25:
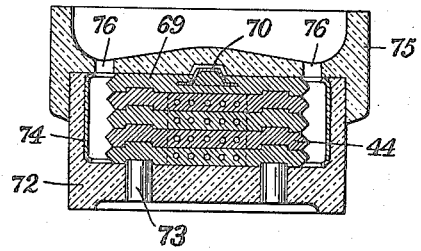

A special peculiarity of these hot wire devices, and particularly of the casts according to Figs. 16 to 19 having the form of a flat frame-work, is that in spite of the large number of hot wires they can be made as simply as when there is only one single hot wire, and several such frame-like cast bodies or hot wire devices can be placed one upon another in such manner that the sound chambers 45 in the cast bodies communicate one with another. A number of such cast bodies can then be united by means of a metal holder after the wires have been suitably connected, so that a body or device is produced in which is embedded a very large number of hot wires close together. In order to secure the cast bodies in their relative positions so that the sound chambers communicate one with another when the cast bodies are united one over another, as shown in Fig. 22 each frame 44 is preferably provided on the one side with projections or lugs 67 and on the other side at like distances apart with recesses or cavities 68, or reversely. A number of such cast bodies can then be placed one on another in the manner shown in Fig. 25 in such manner that the projections 67 of one cast body enter into the recesses in another. When the requisite number of such cast bodies is assembled the projecting ends 46′ of the Wollaston wires 46 are first connected in the manner desired for the time being by twisting and soldering them together. On the cast bodies is placed a plate-like cover 69 (Figs. 23 to 25) composed of the same material as the casts and containing in the middle a metal cap 70 whose edge is embedded together with a metal conductor 71 connected therewith in the cover, the free end of the conductor projecting laterally out of the cover. This conductor is connected in the requisite manner with that of the following cast body so that the cap 70 forms a contact for the line wire. These assembled cast bodies are now placed in a mold 72 whose bottom contains two or more projections 73 which enter into the recesses 68 in the lowest cast body so that these projections 73 secure the cast bodies in their position in the mold. The mold 72 is now provided with a lining 74 of any hard resisting material, preferably metal, but of course this lining, which subsequently forms a holder, may be inserted earlier in the mold if desired. This metal lining or holder 74 is preferably cylindrical, has inwardly directed edges for securely holding the material to be filled into it, and may be connected with one end of a wire 46′ of one of the cast bodies, preferably that which is first inserted in the mold, when the holder or lining consists of metal. In this manner a chamber is formed surrounding the cast bodies 44 and bounded by the lining or holder 74. The mold 72 may be covered by a lid 75 having holes 76 so that the mass cast in the recessed cover 75 passes through these holes into the said chamber and in this way on the one hand firmly unites together the various hot wire devices placed loosely one on another, and simultaneously also unites these devices with the metal holder or liner 74 and secures the same therein. In order that the cast bodies may be securely held, as shown in Fig. 25 the same may have pointed edges so that grooves are produced; if preferred, the edges may be provided with projections or incisions to insure the cast bodies being held securely. The various cast bodies 44 may, however, be united by other means, e. g. by fusing them together or by welding them.

When the hot wire devices have been united, after removing the lid of the mold the entire body can be removed from the mold 72 when it will form a compact device having in its middle a number of sound chambers which are traversed by a large number of hot wires, the latter being very stable, in spite of their fineness, in consequence of the above-mentioned ribs being employed. The contacts of this device are formed on the one hand by the metal holder 74 and on the other hand by the cap 70. Such a device can be inserted at once in a suitable case and connected with the telephone line and, in consequence of the employment of the metal holder, is very durable and readily exchangeable, and owing to the arrangement of a large number of hot wires has a very powerful action. In such frame-like or ribbed cast bodies the Wollaston wire can be embedded not only by casting in a mold, but also by employing preliminarily prepared bodies.

In the illustrative embodiment according to Fig. 23 a two-part frame 44$^a$, 44$^b$ is employed, whose parts can likewise be united by pins or projections 67. Each part of the frame is provided with ribs 60 and sound chambers 45. As is particularly shown in the upper part of Fig. 23, the faces of the ribs which are to be united have grooves 77 whose depth is equal to half the diameter of the Wollaston wire to be employed and whose shape corresponds to the section thereof. When the Wollaston wire 46 is placed, in the manner which will be understood from Fig. 26, in the lower part 44$^b$ of the frame and the upper half 44$^a$ is placed thereon, the reciprocal position of the two halves being determined by the projections 67 and cavities 68, the Wollaston wire is secured in its definite position by the recesses 77 in the ribs 60. The two parts of the frame 44$^a$, 44$^b$ can be united in any suitable manner, e. g. by means of an adhesive or by fusion or otherwise. At the places where the bends of the Wollaston wire are located, the halves of the frame may have special recesses 78 in order to enable the wire to be inserted without difficulty. Any desired number of such parts of frames can be prepared in a suitable mold, and also the suitably shaped Wollaston wires, so that it is only necessary to unite the parts in order to produce the finished hot wire devices which then only have to be subjected to the corrosive process. In this case also, in spite of the fineness of the material, the Wollaston wire can be readily treated, secondly, the length of the wire is definite in each case and, lastly, the average workman is able to produce equivalent products because the molds used in making the parts assure the products being similar. Obviously, the frames described above can be made in like manner of a larger number of parts without departing from the scope of the invention.

Figure 27:
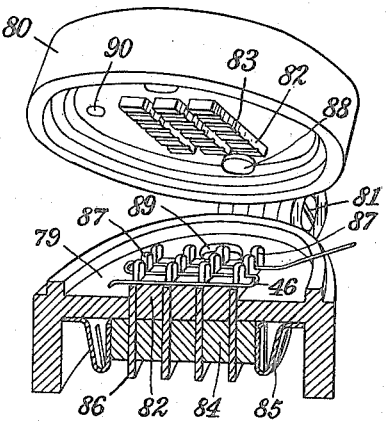

The above described individual, frame-like, hot-wire devices can be made in a simple and preferable manner by using the molds shown in Fig. 27, it being assumed that one frame-like cast body of the type shown in Fig. 16 is to be made for the one or more Wollaston wires. This mold comprises two parts, the bottom part 79 and the cover-like top part 80 which can be connected one with the other in any manner, e. g. by hinges 81 or by dowels. Both parts have on their bottom projections 82 which, as the upper part of Fig. 27 particularly shows are provided with transverse grooves 83, whose depth is equal to half the diameter of the Wollaston wire 46 which is to be employed and whose shape corresponds to the section thereof. The chambers or spaces 45 (Fig. 16) in the frames 44 are formed by the projections 82 which thus constitute cores. In the bottom part of the mold between these cores or projections 82 is inserted from the bottom side of the part 79 a comb-like body assembled of several parts; in the illustrative embodiment this body comprises four parallel combs 86 which are subdivided by rectangular blocks 84 and are firmly connected to form an entirety by means of screw bolts not shown in the drawing. This body is mounted on the under side of the part 79 of the mold by springs 85 by means of friction. The bottom face of this part of the mold has, for this purpose, between the projections 82 and laterally thereof slots through which the individual combs 86 project from below into the mold so far that the teeth of the combs extend beyond the projections 82. The rear of the combs, i. e. the bottom thereof as shown in the position in Fig. 27, are smooth. The mentioned teeth 87 of the comb have a breadth which is adapted to the distance between the turns of the serpentine Wollaston wire or to the distance between the grooves 83 in the projections 82. Lastly, the two parts of the mold 79, 80 have dowel-like projections 88 and corresponding recesses 89 for producing the above-mentioned projections 67 and 68 of the cast body. This mold is used as follows:—

The preliminarily bent and shaped Wollaston wire is pressed by the fingers, in the manner which will be understood from Fig. 27, between the teeth 89 of the comb-like body so that the individual turns of wire are parallel and at equal distances one from another. As the gaps between the teeth are located exactly at the places at which the cores 82 are provided with ribs 83 for receiving the Wollaston wire, it is clear that by employing such a comb-like adjuster the Wollaston wire can be rapidly and exactly arranged in position however many number of turns it has. When the turns of the Wollaston wire have been arranged in this manner, the cover-like part 80 of the mold is placed in position and the ribs 82 of the top part of the mold enter from above between the individual teeth of the adjuster and press from above on the wire 46, whereby the wire is firmly held between the grooves 83 in the upper ribs 82 and the similar grooves in the lower ribs. Thereupon, the comb-like adjuster 84, 86, 87 is withdrawn from the bottom part 79 of the mold and again inserted, but in the reverse sense, between the springs 86 so that the holes in the bottom of the lower part 79 of the mold, through which the teeth 87 were previously passed, are closed. The smooth ends of the plates 86 are then located approximately in the same plane as the inner face of the bottom of the part 79 of the mold, so that the spaces requisite for forming the ribs 60 are made between the projections 82 just as in the top part of the mold. It is now only necessary to fill in through a hole 90 the mass, which in this case preferably consists of a plastic, subsequently hardening material insoluble in acid, in order to produce a ribbed body of the shape shown in Fig. 16. The other forms of the invention can be produced in a similar manner; the adjuster 84, 86, 87 must, however, of course be adapted to the corresponding form of the Wollaston wire or to the shape of the frame. Such an adjuster can also be employed with a mold similar to that shown in Fig. 26.

In the above it has always been assumed that the transverse ribs 60 are composed of the same material as the cast itself. It is, however, possible to produce such ribs or supports of other material which in this case must be embedded in the cast. Such an illustrative embodiment is shown in Fig. 28 and in Fig. 29. In Fig. 28, figured, ribbon-like supports 91 are employed as transverse ribs which are likewise located transversely of the Wollaston wires so that they can support the hot wires repeatedly just as the above-described ribs 60. These ribbon-like supports or bars 91 extend to the frame-like cast 44 and are embedded therein. The same purpose is attained in a similar manner in Fig. 29 by means of thin wires 92 having loop-like eyes 93 in which are mounted the hot wires 46. Both the ribbon-like supports 91 and the wire-like supports 92 are preferably composed of a material, e. g. platinum, which cannot be dissolved in the acid employed for the corrosive process, or they are coated with such a material, or they are covered with a material, e. g. an enamel, which is not soluble in acid. The last mentioned material is preferable when the cost of manufacture is to be reduced as much as possible. Instead of wires, thin glass bodies or bodies of similar material can be successfully employed. In the illustrative embodiments according to Figs. 28 and 29 the Wollaston wires are all connected in parallel by means of sheet-metal bars 94 similarly as in Figs. 7 and 8. As will be readily understood, the wires may be connected in series without departing from the scope of the invention. Moreover, these ribs may consist of two or more parts which may be provided at their abutting faces with grooves suitable for holding the turns of the wires, so that by uniting such parts, e. g. by cementing them or gluing them together, the Wollaston wire is securely held in them.

In the above it has been stated that the variously constructed hot-wire devices are intended for thermo-telephones. It is, however, obvious that such hot-wire devices or those having differently shaped cast bodies can also be employed for all other apparatus in which electrothermic actions occur, e. g. for bolometers and the like. The employment of these hot-wire devices in the manner last described is therefore also comprehended in the present invention. Furthermore, it is self-evident that a Wollaston band, instead of a Wollaston wire, may be employed, within the scope of this invention.

I claim:—

1. In a thermo-telephone, an integral cast-body, a Wollaston wire embedded in and held by said cast-body, and partially lying free in it in a protected position, the ends of said wire projecting out of said integral cast-body, and the protected portion of the wire being free from its coating.

2. In a thermo-telephone, an integral cast-body, a Wollaston wire embedded in and held by said cast-body, said wire passing through a recess in the said cast-body, the ends of the said wire projecting out of the cast-body, and the portion of the wire traversing the recess being free from its coating.

3. In a thermo-telephone, the combination with a framelike cast having an aperture therein, of a Wollaston wire traversing the said aperture and having limbs projecting out of the cast, the portion of the wire traversing the aperture being free from its coating, and the said aperture being traversed by ribs for supporting the said wire.

4. In a thermo-telephone, the combination with a framelike cast having an aperture therein, of a Wollaston wire traversing the said aperture and having limbs projecting out of the cast, the portion of the wire traversing the aperture being free from its coating, and the said aperture being traversed by ribs for supporting the said wire, both the said wire and the said ribs being disposed transversely of the longitudinal axis of the cast.

5. In a thermo-telephone, the combination with a framelike cast having an aperture therein, of a Wollaston wire traversing the said aperture and having limbs projecting out of the cast, the portion of the wire traversing the aperture being free from its coating, and the said aperture being traversed by ribs for supporting the said wire, both the said wire and the said ribs being disposed transversely of the longitudinal axis of the cast, the ribs dividing the aperture into a plurality of compartments.

6. In a thermo-telephone, an integral flat cast-body, a Wollaston wire embedded in and held by the said integral cast-body, and partially lying free in it in a protected position, the ends of the said cast-wire projecting out of the case, and the protected free portion of the wire being free from its coating.

7. In a thermo-telephone, a single flat cast-body, a Wollaston wire embedded in and held by the said cast-body, and traversing a recess in the said integral cast-body, the ends of the said wire projecting out of the cast-body, and the portion of the wire traversing the recess or aperture being free from its coating.

8. In a thermo-telephone, the combination with a flat framelike cast having an aperture therein, of a Wollaston wire traversing the said aperture and having limbs projecting out of the cast, the portion of the wire traversing the aperture being free from its coating, and the said aperture being traversed by ribs for supporting the wire.

9. In a thermo-telephone, the combination with a flat framelike cast having an aperture therein, of a Wollaston wire traversing the said aperture and having limbs projecting out of the cast, the portion of the wire traversing the aperture being free from its coating, and the said aperture being traversed by ribs for supporting the wire, the ribs dividing the aperture into a plurality of compartments each of which is traversed by said wire.

10. In a thermo-telephone, the combination with a flat framelike cast having an aperture therein, the said aperture being traversed by radial ribs, of a Wollaston wire traversing the different compartments formed by the radial ribs and having limbs projecting out of the cast, the parts of the wire traversing the compartments being free from its coating.

11. In a thermo-telephone, the combination with a flat framelike cast having an aperture therein, the said aperture being traversed by radial ribs, of a core at the center of the framelike cast, interconnecting the said ribs, and a Wollaston wire traversing the different compartments formed by the radial ribs and the said core and having limbs projecting out of the cast, the parts of the wire traversing the compartments being free from its coating.

12. In a thermo-telephone the combination with a flat framelike cast having an aperture therein, the said aperture being traversed by radial and concentric ribs, of a core at the center of the framelike cast, interconnecting the said ribs, and a Wollaston wire traversing the different compartments formed by the radial and concentric ribs and the core and having limbs projecting out of the cast, the parts of the wire traversing the compartments being free from its coating.

13. In a thermo-telephone, the combination with a flat framelike cast having an aperture therein, the said aperture being traversed by radial and concentric ribs, of a core at the center of the framelike cast, interconnecting the said ribs, and a stellar Wollaston wire traversing the different compartments formed by the radial and concentric ribs and the core and having limbs projecting out of the cast, the parts of the wire traversing the compartments being free from its coating.

14. In a thermo-telephone, the combination with a flat framelike cast having an aperture therein, the said aperture being traversed by radial and concentric ribs, of a core at the center of the framelike cast, interconnecting the said ribs, a stellar Wollaston wire traversing the different compartments formed by the radial and concentric ribs and the core and having limbs projecting out of the cast, the parts of the wire traversing the compartments being free from its coating, means at the center of the frame electrically connecting the inner portions of the wire, and means at the outer part of the frame electrically connecting the outer portions of the wire.

15. In a thermo-telephone, the combination with a flat framelike cast having an aperture therein, the said aperture being traversed by radial and concentric ribs, of a core at the center of the framelike cast, interconnecting the said ribs, a stellar Wollaston wire traversing the different compartments formed by the radial and concentric ribs and the core and having limbs projecting out of the cast, the parts of the wire traversing the compartments being free from its coating, a disk electrically interconnecting the inner portions of the wire and a ring electrically interconnecting the outer portions of the wire.

16. In a thermo-telephone, the combination with a flat framelike cast having an aperture therein, the said aperture being traversed by radial and concentric ribs, of a core at the center of the framelike cast, interconnecting the said ribs, a stellar Wollaston wire traversing the different compartments formed by the radial and concentric ribs and the core and having limbs projecting out of the cast, the parts of the wire traversing the compartments being free from its coating, a disk electrically interconnecting the inner portions of the wire, and a ring electrically interconnecting the outer portions of the wire, one of the said limbs being connected with the disk and the other with the said ring.

17. In a thermo-telephone, the combination with a flat framelike cast having an aperture therein, the said aperture being traversed by radial and concentric ribs, of a core at the center of the framelike cast, interconnecting the said ribs, a stellar Wollaston wire traversing the different compartments formed by the radial and concentric ribs and the core and having limbs projecting out of the cast, the parts of the wire traversing the compartments being free from its coating, a disk electrically interconnecting the inner portions of the wire, and a ring electrically interconnecting the outer portions of the wire, one of said limbs being connected with the disk and the other with said ring, the said flat frame being adapted to be superposed to another similar flat frame for building up a body consisting of a plurality of single frames.

18. In a thermo-telephone, the combination with a framelike cast having an aperture therein, of a Wollaston wire divided or separated into a plurality of parts connected to each other in a suitable manner, the said parts traversing the said aperture and being free from the coating of the wire and having common limbs projecting out of the cast.

19. In a thermo-telephone, the combination with a framelike cast having an aperture therein, of a Wollaston wire divided or separated into a plurality of parts connected in parallel to each other, the said parts traversing the said aperture and being free from the coating of the wire, and having common limbs projecting out of the cast.

20. In a thermo-telephone, the combination with a flat framelike cast having an aperture therein, of a Wollaston wire divided or separated into a plurality of parts connected in parallel to each other, the said parts traversing the said aperture and being free from the coating of the wire and having common limbs projecting out of the cast.

21. In a thermo-telephone, the combination of an integral cast-body, a Wollaston wire embedded therein, and having a part thereof lying free from said integral cast-body, said free part being substantially free from its coating, and means for connecting the ends of said Wollaston wire to the line wires.

In testimony, that I claim the foregoing as my invention, I have signed my name in presence of two subscribing witnesses.

BRONISŁAW GWÓŹDŹ.

Witnesses:
HENRY HASPER,
WOLDEMAR HAUPT.